M. J. Van Aken,

Horse Poke.

No. 109,088.  Patented Feb. 22, 1870.

Witnesses
Edmund Masson

Myres J. Vanaker.
By atty. A. B. Stoughton.

United States Patent Office.

MYRES J. VAN AKEN, OF STURGIS, MICHIGAN.

Letters Patent No. 100,088, dated February 22, 1870.

IMPROVEMENT IN HORSE-POKE.

The Schedule referred to in these Letters Patent and making part of the same.

I, MYRES J. VAN AKEN, of Sturgis, in the county of St. Joseph, and State of Michigan, have invented a new and improved Horse-Poke, of which the following is a specification.

I am aware that pokes have been suspended from the necks of animals by a yoke or bow, from which an arm is projected forward, designed to take under the rails, to prevent the animals from jumping the fence. But such pokes, beside being insufficient for the purpose, are so rigid as to interfere with the eating or grazing of the horse in the pasture, and I lay no claim to any such device.

My invention consists in a poke made of a single straight, or nearly so, piece of wood, and furnished with straps, bands, ropes, or their equivalent, so that the rear end of the poke may be secured to the body of the horse, and the forward part thereof suspended from the horse's head, which allows the animal free and unrestrained use of his head whilst grazing, but entirely prevents him from raising his head when the poke has passed through or under the rails of the fence, and so entirely prevents him from jumping the fence.

To enable others skilled in the art to make and use my invention, I will proceed to describe the same, with reference to the drawings.

A represents the poke.

Figure 1:
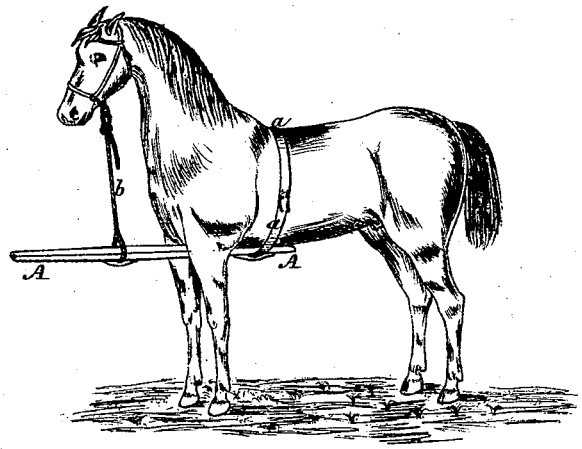
Figure 1 represents the mode of securing the poke to a horse.
Figure 2:
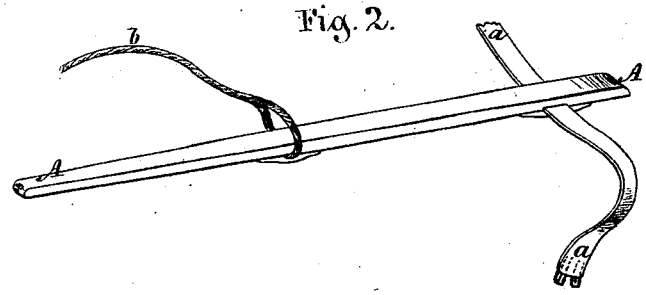
Figure 2 represents in perspective the poke and strap and rope, by which it is secured to the horse.

At or near its rear end there is secured, in any well-known way, a circingle, *a*, which, when the poke is applied to the horse, as shown in fig. 1, is buckled around his body behind the fore-shoulders, the poke then projecting forward between the fore-legs, as therein seen, a suitable distance, and in a horizontal, or nearly so, position, so that when a horse approaches a fence the poke will pass in between or under the rails thereof.

At a point in the line of the length of the poke that would be vertically, or nearly so, under the head of the horse, is arranged or fastened in any usual well-known way, a rope, strap, or other flexible piece, *b*; which is fastened, by preference, to a common halter on the horse's head, but may be fastened in any other way to the head of the horse, so that he may graze or feed without any inconvenience, but so that when the poke has passed under or between the rails of the fence the horse cannot raise his head beyond a natural position or height, and consequently jump, it being well known that unless an animal can first raise its head, it cannot jump over a fence.

The piece or line *b* should be fastened in some way to the head of the horse, to prevent him from raising his head. It might be fastened to the neck immediately behind the head, where the headstall and throat-latch ordinarily go, and still answer the purpose. But farther down, or near the base of the neck, it would not answer a good purpose.

By my construction and application of the poke, the horse cannot make the preparatory movement or effort that precedes the leap, and cannot consequently injure himself; whereas, by the ordinary neck or yoke-poke, he is apt to make the leap, being able to raise his head for that purpose, and is suddenly checked by the after action of the poke, and frequently with much injury to the animal. And, though more specially made for application to a horse, it may be applied to other animals.

Having thus fully described my invention,

What I claim therein as new, and desire to secure by Letters Patent, is—

An animal poke, which, at its rear, is fastened to the body, and at its forward portion is attached or suspended to the head of the animal, in the manner and for the purpose herein described and represented.

MYRES J. VAN AKEN.

Witnesses:
ISAAC D. TOLL,
CHARLES P. TOLL.